United States Patent
Moeller et al.

(10) Patent No.: US 6,745,997 B2
(45) Date of Patent: Jun. 8, 2004

(54) METHOD OF AND APPARATUS FOR OPERATING AN ACTUATOR

(75) Inventors: Herbert Moeller, Bad Oeynhausen (DE); Marcel Schilg, Warmsen (DE)

(73) Assignee: ABB Patent GmbH, Mannheim (DE)

( * ) Notice: Subject to any disclaimer, the term of this patent is extended or adjusted under 35 U.S.C. 154(b) by 0 days.

(21) Appl. No.: 10/142,038

(22) Filed: May 9, 2002

(65) Prior Publication Data

US 2002/0175304 A1 Nov. 28, 2002

(30) Foreign Application Priority Data

May 22, 2001 (DE) ........................................ 101 24 847

(51) Int. Cl.[7] ............................................. F16K 31/02
(52) U.S. Cl. .............................. 251/129.04; 251/129.13
(58) Field of Search ...................... 251/129.04, 129.13, 251/129.11

(56) References Cited

U.S. PATENT DOCUMENTS

| | | | | |
|---|---|---|---|---|
| 5,036,886 A | * | 8/1991 | Olsen et al. | 251/129.11 |
| 5,069,422 A | * | 12/1991 | Kawamura | 251/129.04 |
| 6,394,415 B1 | * | 5/2002 | Ohmi et al. | 251/129.16 |
| 6,405,693 B2 | * | 6/2002 | Yoeda et al. | 251/129.01 |
| 6,560,088 B1 | * | 5/2003 | Beck et al. | 251/129.01 |

* cited by examiner

*Primary Examiner*—John Bastianelli
(74) *Attorney, Agent, or Firm*—Michael M. Rickin

(57) ABSTRACT

A method of and apparatus for operating an actuator which is used to open and close valves in pipelines in order to avoid pressure surges and resonances during the closing operation in pipelines to be shut off. The closing operation of the valve is subdivided into two closing phases ($S_1$ and $S_2$). During the first closing phase ($S_1$), the actuating element is moved at maximum actuating speed down to a predefinable position (P) of the actuating element, starting from the open state of the valve. From this position (P), the actuating speed of the actuating element is reduced continuously and steplessly with a predefinable gradient. Additionally when the actuating speed in the second closing phase is reduced to a predefinable constant value the method and apparatus may include a third phase during which the actuator maintains that speed value until the valve is closed.

6 Claims, 2 Drawing Sheets

METHOD OF AND APPARATUS FOR OPERATING AN ACTUATOR

FIELD OF THE INVENTION

This invention relates to a method of operating an actuator which is used to open and close valves in a pipeline and more particularly to the avoiding of pressure surges and resonances when the valve is closed.

DESCRIPTION OF THE PRIOR ART

In the water supply sector there is the problem, in particular but not exclusively in the remote water supply sector, that when valves are closed, as a result of the water columns in the pipeline, which are often several kilometers long, pressure surges occur, which can lead to the pipeline bursting. This problem becomes pressing during disasters, in which the pipeline has to be shut off as quickly as possible.

From the catalogue number DO 01.01.004D/1.97, page 22 from AUMA—Werner Riester GmbH & Co. KG, it is known to operate the drive motor of the actuator in a clocked manner, starting from the open state of the valve and as the closed state of the valve is approached. In this case, the drive motor of the actuator is switched ON and OFF periodically in accordance with predefinable run and pause times.

Although, with the known solution, it is possible to limit the intensity of the pressure surges, it is not possible to avoid the pressure surges. Furthermore, by means of the clocked operation of the drive motor, periodic pressure surges are produced in the pipeline, which are amplified by the excitation of resonance and can lead to the pipeline bursting. Furthermore, the higher mechanical load on the actuator and the valve as a result of the clocked operation promotes wear and is therefore disadvantageous.

In order to keep the relative adjustment travel jump and therefore the first pressure surge as low as possible, the clocked operation must be started as early as possible. The resulting prolongation of the actuating time until the valve is closed completely is viewed as disadvantageous in disasters, in which the pipeline must be shut off as quickly as possible.

The invention is therefore based on the object of specifying a method of operating an actuator which avoids pressure surges and resonances which endanger the pipeline and, nevertheless, permits a short actuating time.

SUMMARY OF THE INVENTION

The invention is based on an actuator, known per se, for opening and closing, a so-called OPEN/SHUT drive, a valve in a pipeline, the valve having a movable actuating element which is operated by the actuator.

The closing operation of the valve is subdivided into at least two closing phases. During the first closing phase, the actuating element is moved at maximum actuating speed down to a predefinable position of the actuating element, starting from the open state of the valve.

According to the invention, from this predefinable position of the actuating element, in the second closing phase, the actuating speed of the actuating element is reduced continuously and steplessly with a predefinable gradient.

During the closing action, the pressure in the pipeline to be shut off rises in proportion to the actuating speed. As a result of the continuously stepless change in the actuating speed with a predefinable gradient, pressure surges in the pipeline to be shut off are avoided. For this reason, and because of a lack of periodicity in the change in the actuating speed within an actuating operation, the excitation of resonance in the pipeline is also avoided.

As a result of the continuously stepless change in the actuating speed, the armature is closed in a short actuating time, utilizing the permissible pressure in the pipeline.

According to a further feature of the invention, the actuating speed in the second closing phase is reduced to a predefinable constant speed value. In a following third closing phase, this reduced actuating speed is maintained until the valve is closed completely.

As a result, with early restriction of the actuating speed as a function of the parameters of the pipeline, the closing of the valve is achieved with a minimum actuating time.

DESCRIPTION OF THE DRAWING

The invention will be explained in more detail below using exemplary embodiments. In the drawings required for this.

DESCRIPTION OF THE PREFERRED EMBODIMENT(S)

Figure 1:
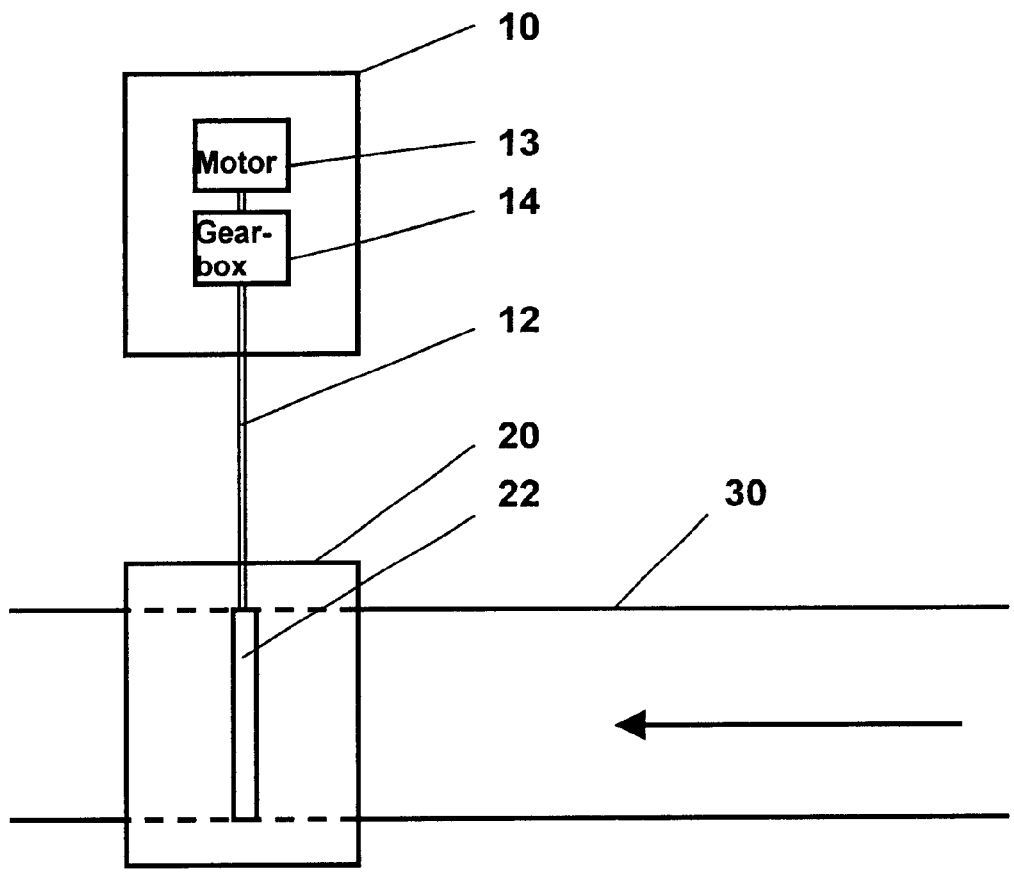
FIG. 1 shows a basic representation of an actuator with a valve.

FIG. 1 shows an actuator 10 which is known per se and which is substantially provided with a gearbox 14 which is arranged in a housing, is driven by a drive motor 13 and has an output drive 12. Also shown is a valve 20, known per se, which substantially comprises a valve body in which an actuating element 22 is arranged such that it can move. The actuating element 22 is connected to the output drive 12 of the gearbox 14.

Figure 2:
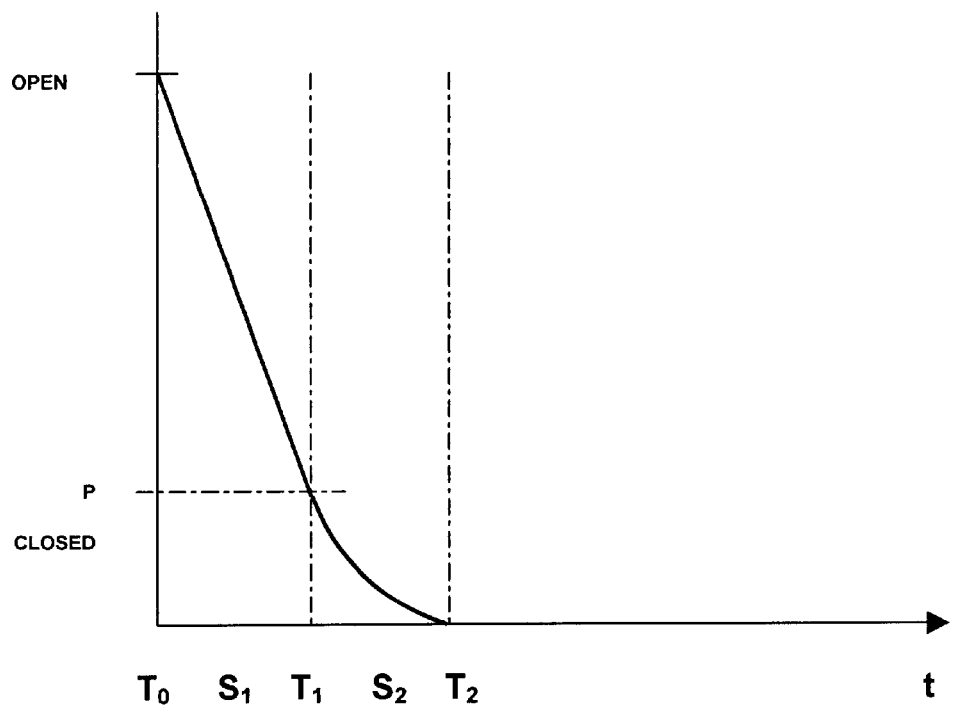
FIG. 2 shows a characteristic curve for the closing operation in two closing phases.

FIG. 2 shows a characteristic curve for the closing operation in accordance with a first embodiment of the invention. In this case, the position of the actuating element 22 between the limiting values OPEN AND CLOSED is plotted against the time t.

The closing operation is subdivided into two closing phases $S_1$ and $S_2$. Starting from the completely open state of the valve 20, the closing operation is started at the time mark $T_0$. During the first closing phase $S_1$ from the time mark $T_0$ to the time mark $T_1$ at the predefinable position P, the actuating element 22 is moved at the maximum actuating speed.

From the predefinable position P, the actuating speed of the actuating element 22 is reduced continuously and steplessly with a predefinable gradient during the second closing phase $S_2$ from the time mark $T_1$ to the time mark $T_2$. In this case, the predefinable position P and the gradient of the change in the actuating speed are adjusted in such a way that no pressure surges are produced in the pipeline. At the time mark $T_2$ the drive motor is switched off.

Figure 3:
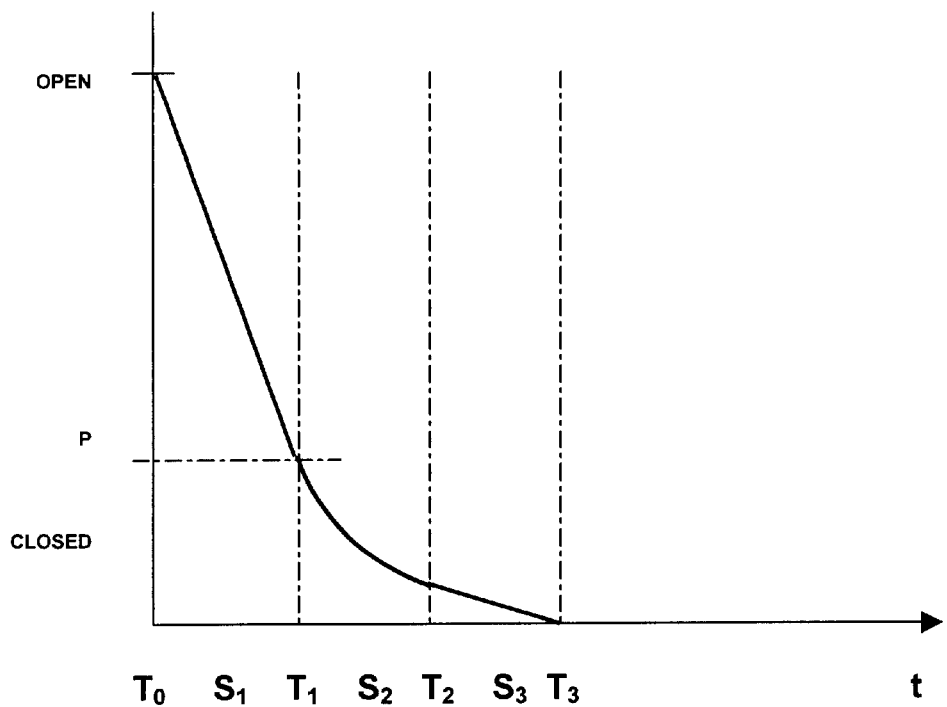
FIG. 3 shows a characteristic curve for the closing operation in three closing phases.

Depending on the parameters of the pipeline 30, early restriction of the actuating speed may be necessary. For this purpose, a characteristic curve for the closing operation in accordance with a second embodiment of the invention is illustrated in FIG. 3. As in FIG. 2, the position of the actuating element 22 between the limiting values OPEN and CLOSED is plotted against the time t.

The closing operation is subdivided into three closing phases $S_1$, $S_2$ and $S_3$. Starting from the completely open state of the valve 20, the closing operation is started at the time mark $T_0$. During the first closing phase $S_1$ from the time mark $T_0$ to the time mark $T_1$ at the predefinable position P, the actuating element 22 is moved at the maximum actuating speed. As distinct from the first embodiment, the duration of the first closing phase $S_1$ is shorter and the valve 20 is opened further at the predefinable position P.

From the predefinable position P, the actuating speed of the actuating element 22 is reduced continuously and steplessly with a predefinable gradient to a predefinable minimum actuating speed during the second closing phase $S_2$ from the time mark $T_1$ to the time mark $T_2$.

During the following third closing phase $S_3$ from the time mark $T_2$ to the time mark $T_3$, the actuating element 22 is moved at the predefinable minimum actuating speed down to the completely closed state of the valve 20.

By means of suitable selection of the predefinable position P at the time mark $T_1$ and the gradient of the actuating speed, the minimum actuating time is adjusted at the maximum pressure in the pipeline 30 to be shut off.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method of operating an actuator for opening and closing a valve in a pipeline, the valve having a movable actuating element which is operated by the actuator, comprising:

closing the valve at maximum actuating speed during a first closing phase until said valve reaches a predefinable position;

closing said valve during a second closing phase such that the actuating speed of the actuating element of the valve is reduced continuously and steplessly with a predefinable gradient until said actuating speed is reduced to a predefinable constant speed value; and closing said valve during a third closing phase by maintaining said predefinable constant speed value until said valve is completely closed.

2. An apparatus for closing a valve in a pipeline comprising:

an actuator connected to an actuating element of said valve;

said actuator driving said valve from an open position to a closed position by:

closing said valve at maximum actuating speed during a first closing phase until said valve reaches a predefinable position;

closing said valve during a second closing phase such that the actuating speed of the actuating element of the valve is reduced continuously and steplessly with a predefinable gradient until said actuating speed is reduced to a predefinable constant speed value; and closing said valve during a third closing phase by maintaining said predefinable constant speed value until said valve is completely closed.

3. A combination comprising:

a pipeline;

a valve in said pipeline;

an actuator connected to an actuating element of said valve;

said actuator driving said valve from an open position to a closed position by:

closing said valve at maximum actuating speed during a first closing phase until said valve reaches a predefinable position; and closing said valve during a second closing phase such that the actuating speed of the actuating element of the valve is reduced continuously and steplessly with a predefinable gradient until said actuating speed is reduced to a predefinable constant speed value; and closing said valve during a third closing phase by maintaining said predefinable constant speed value until said valve is completely closed.

4. A method of operating an actuator for closing a valve in a pipeline, said pipeline for having a liquid flowing therethrough, the valve having a movable actuating element which is operated by the actuator, comprising:

closing the valve at maximum actuating speed during a first closing phase until said valve reaches a predefinable position; and closing said valve during a second closing phase such that the actuating speed of the actuating element of the valve is reduced continuously and steplessly with a predefinable gradient, said closing of said valve during said first closing phase and during said second closing phase avoiding pressure surges and resonances in said liquid;

wherein the actuating speed in said second closing phase is reduced to a predefinable constant speed value and said method further comprises closing said valve during a third closing phase in which said predefinable constant speed value is maintained until said valve is completely closed.

5. An apparatus for closing a valve in a pipeline, said pipeline for having a liquid flowing therethrough, comprising:

an actuator connected to an actuating element of said valve;

said actuator driving said valve from an open position to a closed position by:

closing said valve at maximum actuating speed during a first closing phase until said valve reaches a predefinable position; and closing said valve during a second closing phase such that the actuating speed of the actuating element of the valve is reduced continuously and steplessly with a predefinable gradient, said closing of said valve during said first closing phase and during said second closing phase avoiding pressure surges and resonances in said liquid;

wherein said valve actuating speed in said second closing phase is reduced to a predefinable constant speed value and further comprises closing said valve during a third closing phase in which said predefinable constant speed value is maintained until said valve is completely closed.

6. A combination comprising:

a pipeline for having a liquid flowing therethrough;

a valve in said pipeline;

an actuator connected to an actuating element of said valve;

said actuator driving said valve from an open position to a closed position by:

closing said valve at maximum actuating speed during a first closing phase until said valve reaches a predefinable position; and closing said valve during a second closing phase such that the actuating speed of the actuating element of the valve is reduced continuously and steplessly with a predefinable gradient, said closing of said valve during said first closing phase and during said second closing phase avoiding pressure surges and resonances in said liquid;

wherein said valve actuating speed in said second closing phase is reduced to a predefinable constant speed value and further comprises closing said valve during a third closing phase in which said predefinable constant speed value is maintained until said valve is completely closed.

* * * * *